Nov. 24, 1970   T. R. SMITH ET AL   3,542,594
FLUID CONTROL SYSTEM
Filed June 19, 1968   4 Sheets-Sheet 1

INVENTORS.
THOMAS R. SMITH
STEWART W. FAUST
BY
William G. Landwier
AGENT

Nov. 24, 1970  T. R. SMITH ET AL  3,542,594
FLUID CONTROL SYSTEM
Filed June 19, 1968  4 Sheets-Sheet 2
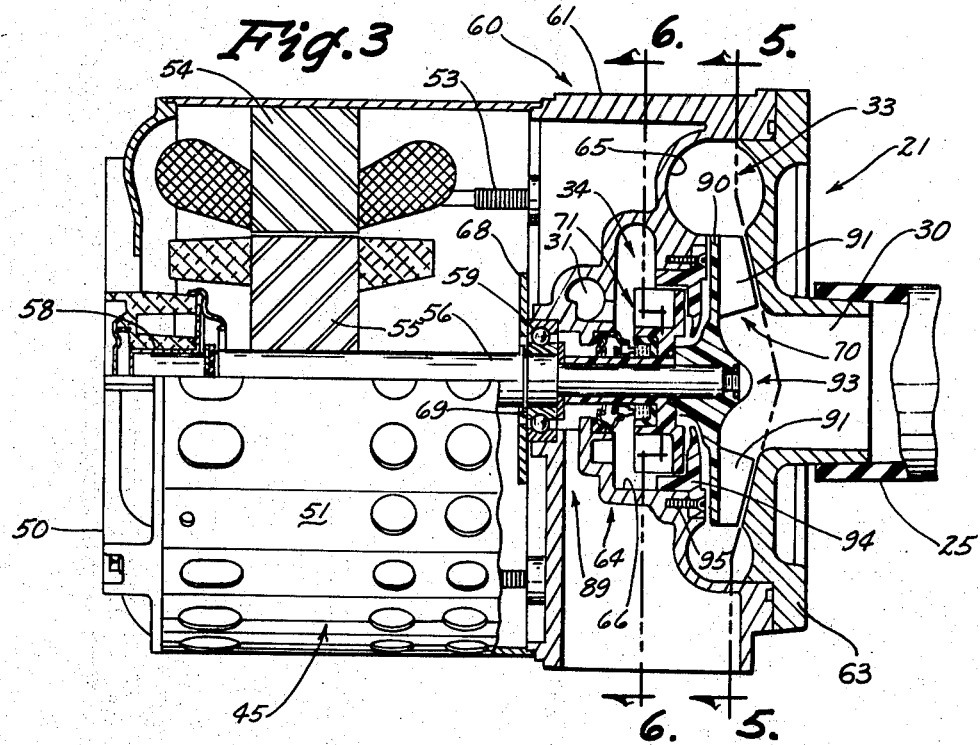
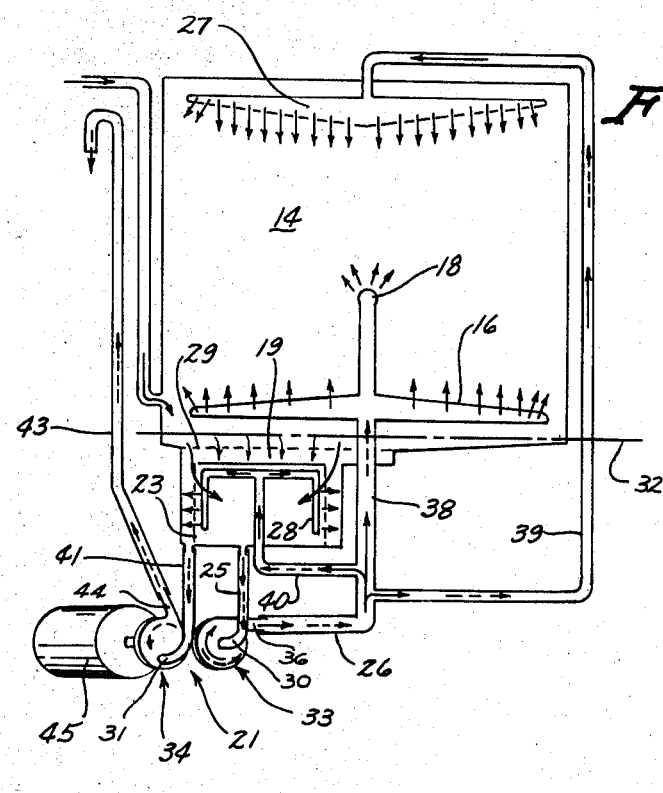
INVENTORS.
THOMAS R. SMITH
STEWART W. FAUST
BY
William G. Landwier
AGENT INVENTORS.
THOMAS R. SMITH
STEWART W. FAUST
BY William G. Landwier
AGENT

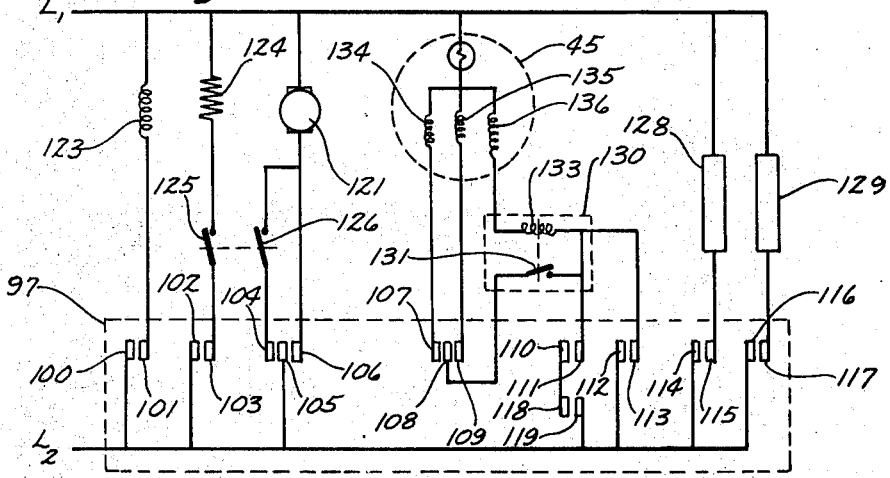
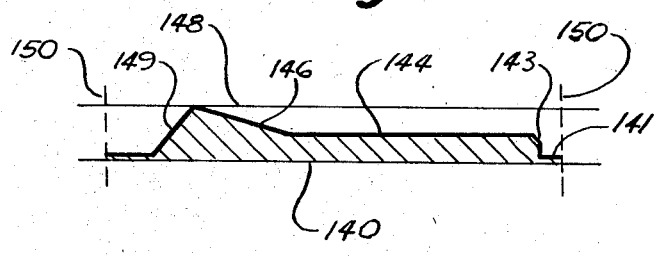

United States Patent Office 3,542,594
Patented Nov. 24, 1970

3,542,594
FLUID CONTROL SYSTEM
Thomas R. Smith and Stewart W. Faust, Newton, Iowa, assignors to The Maytag Company, Newton, Iowa, a corporation of Delaware
Filed June 19, 1968, Ser. No. 738,277
Int. Cl. B08b 3/02
U.S. Cl. 134—25
7 Claims

ABSTRACT OF THE DISCLOSURE

A fluid control system for a dishwashing apparatus includes a reversible two-cavity pump assembly with each of the cavities having an inlet in open fluid communication with the washing chamber and with the first cavity having an outlet in open fluid communication with the fluid distribution means and the second cavity having an outlet in open fluid communication with an external drain conduit. An impeller is disposed within each of the cavities and a divider is positioned between the cavities for defining an annular orifice therebetween. Operation of the impellers in a first direction effects pumping of fluid from said chamber to the fluid recirculation means with the first pump while the second pump maintains a substantially static low pressure head at the outlet thereof to prevent drainage of fluid from said chamber while preventing suction of fluid from the drain. The pumps are operable in the opposite direction to initially continue recirculation of fluid with the first pump while the second is operable for draining fluid from the chamber and pumping it toward an external drain.

BACKGROUND OF THE INVENTION

The field of the invention

This invention relates to a washing apparatus and more particularly to a dishwasher fluid control system for selectively achieving recirculation or draining of the fluid.

Description of the prior art

Prior art has shown dishwashers in which fluid is pumped from a sump area to a distribution system within the chamber for spraying washing fluid on the articles to be washed. It has also been shown desirable to provide a filter system for removing particles from the fluid prior to recirculation onto the articles within the chamber. In addition, prior art has shown the desirability of providing a second pump communicating with the sump and operable during a drain portion of the cycle for removing fluid from the sump and pumping it toward an external drain.

In the interest of economy, the combination of these two pumps into a device driven by a single motor is desirable. Prior art devices, however, include certain compromises and limitations or rely on auxiliary devices to achieve the desired selective fluid control. In some of these devices, in which the common drive means is operable for driving both pumps, auxiliary valves are required to prevent the draining of the tank during recirculation or to prevent suction of fluid from the drain into the sump. In still other devices, limitations on impeller design or pump cavity configuration or the addition of vents to various portions of the pump cavity are included to overcome undesirable features present in the previous devices. Some of the devices simply accept undesirable characteristics such as that of allowing some backflow of fluid through the drain pump during the recirculation operation.

Still other prior art shows the desirability of providing a self-cleaning filter system associated with fluid distribution control. Such a system is shown in United States Pat. 3,090,391 issued to H. J. Kaldenberg et al., May 21, 1963 and assigned to the assignee of the instant invention. Provision of such a filter in a two-cavity combination pump design brings with it additional problems of providing sufficient fluid flow to the self-cleaning filter to maintain the filter clean during the washing cycle and during the initial portion of the drain cycle.

SUMMARY OF THE INVENTION

It is an object of this invention to provide an improved fluid control system for achieving selective recirculation of fluid within a washing chamber and drainage of fluid from the washing chamber.

It is a further object of the present invention to provide an improved fluid control system for a dishwashing apparatus including a motor-driven dual pump assembly for achieving recirculation of fluid during a wash operation and pump-out of fluid during a drain operation.

It is a further object of the present invention to provide a fluid control system for a dishwashing apparatus including a reversibly driven dual pump assembly operable for effecting a recirculation of fluid to the washing chamber during the wash operation and at least the initial portion of the drain operation while selectively effecting removal of fluid only during the drain operation with a system free of electromechanical values.

It is yet a further object of the present invention to provide a fluid control system for a dishwasher having a pair of commonly driven reversible pumps wherein each includes an inlet openly communicating with the washing chamber and the first pump includes an outlet communicating with the fluid distribution system and the second pump includes an outlet in open communication with the drain conduit and wherein the pumps are operable as a unit for achieving recirculation of washing fluid during the washing operation while preventing discharge of fluid to the drain conduit and preventing suction of fluid from the drain.

The above objects are realized in a dishwashing apparatus having a pump assembly including two cavities and being selectively driven in either direction by a reversible motor to achieve a recirculation of fluid with one of the pumps and a substantially static fluid condition with the other of the pumps during rotation in a first direction and to selectively achieve a recirculation of fluid with one of the pumps and discharge of fluid from the washing chamber with the other of the pumps with the motor rotating in the second direction.

Operation of the device and further objects and advantages thereof will become evident as the description proceeds and from an examination of the accompanying four pages of drawings which illustrate a preferred embodiment

BRIEF DESCRIPTION OF THE DRAWINGS

FIG. 3 is a sectional view of the motor and pump assembly embodying elements of the instant invention with the section being taken substantially in the plane defined by the longitudinal axis of the pump assembly and by lines 3—3 in FIG. 2;

FIG. 4 is a schematic drawing showing relative fluid flow patterns of the instant fluid control system;

FIG. 8 is an electrical schematic circuit showing components and circuitry controlling the dishwashing apparatus shown in FIG. 1;

FIG. 9 is a schematic diagram related to FIG. 8 and showing sequential operation of timer contacts included in the electrical circuit of FIG. 8; and FIG. 10 is a diagrammatic view showing the development of a portion of the second pump cavity.

DESCRIPTION OF THE PREFERRED EMBODIMENT

Figure 1:
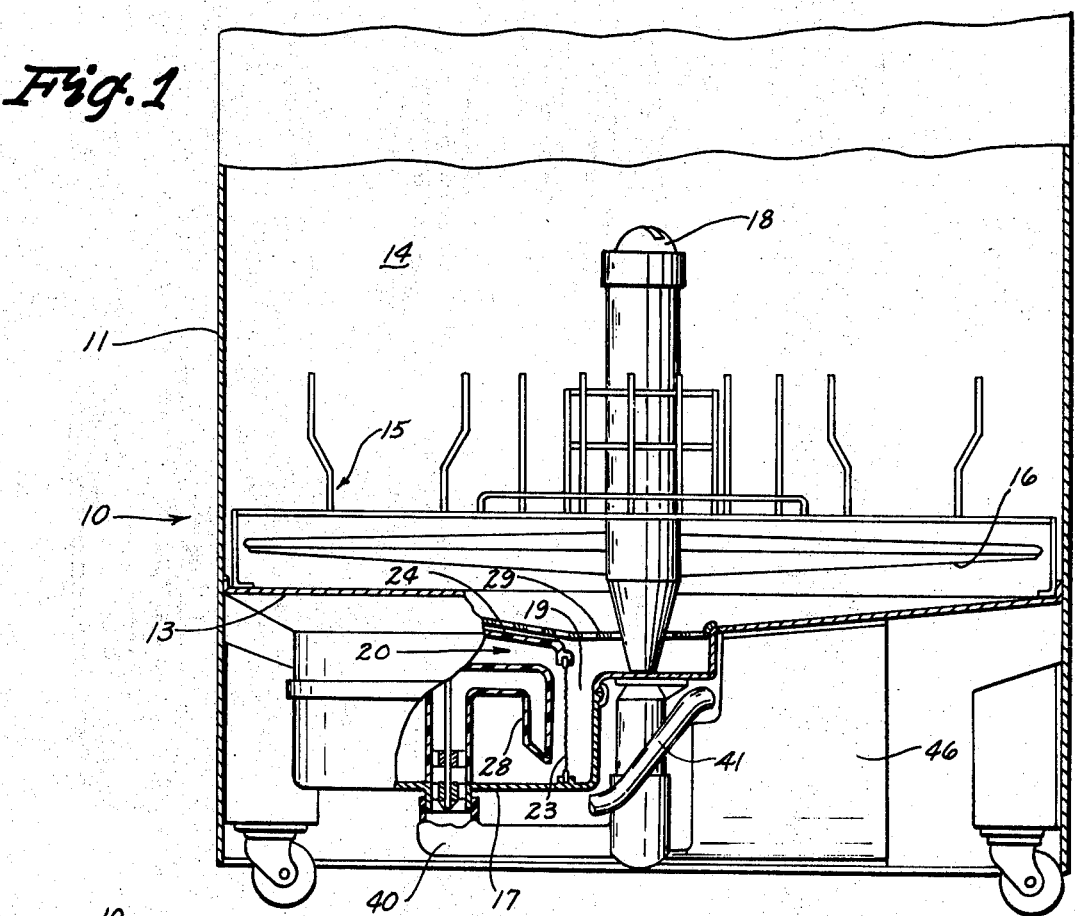
FIG. 1 is an elevational section view of the lower portion of a dishwashing apparatus embodying the instant invention.

Referring to FIG. 1, there is shown the lower portion of a dishwashing apparatus including a cabinet 10 comprising substantially vertical sidewall 11 and a generally horizontally disposed sloping bottom wall 13 cooperable with the sidewall 11 to define a washing chamber 14. Means, such as the rack member 15, is provided within the chamber 14 for holding articles to be washed.

The fluid distribution system, shown generally in FIGS. 1 and 4, includes a rotatable lower spray arm 16 and a spray nozzle 18 rotatable with the spray arm 16 for spraying washing fluid onto the articles within the chamber 14. The fluid recirculated into the washing chamber 14 by the spray arm 16 and the spray nozzle 18 is collected in a sump area 19 defined in part by a housing 17 depending from the bottom wall 13. The fluid system further includes a motor-driven dual pump assembly, shown more specifically in FIGS. 3, 5, 6, and 7 and as will be more described hereinafter.

Filter means 20, located in the sump area 19, is self-cleaning and continuously operable for removing particles from the fluid in the sump area 19 as fluid is drawn through the pump assembly 21 for recirculation to the spray arm 16 and nozzle 18. The filter means 20 includes a cylindrical filter screen 23 having the fine mesh openings and is disposed within the sump area 19 and enclosed at its upper end by a substantially imperforate filter cap 24. As best shown in FIG. 4, the fluid flows from the sump 19 through the filter screen 23 and through the filtered-fluid conduit 25 to the pump 21 and is forced through a recirculation conduit 26 toward the recirculation spray arm 16 and nozzle 18 and upper spray means 27. An auxiliary spray arm 28, located within the filter means 20, is operable for receiving a portion of the fluid from the recirculation conduit 26 and for spraying fluid on the downstream side of the filter screen 23 to remove particles collected on the upstream side thereof. There is also provided a first stage filter 29 upstream from the fine mesh screen 23 for removing the large particles from the washing fluid. Further constructional and operational details of a filter of this type may be found in U.S. Pat. 3,090,391, issued to H. J. Kaldenberg et al., May 21, 1963 and assigned to the assignee of the instant invention.

Means are provided for supplying fluid to the washing chamber 14 from an external source. The fluid is allowed to flow into the sump area 19 and lower portion of the washing chamber 14. The normal fluid level at rest is shown by broken line 32 in FIG. 4.

As best shown in FIG. 4, the sump area 19 communicates with the inlets 30 and 31 of two effectively separate pumps 33 and 34 both of which are housed within the combined dual pump assembly 21. Though shown below the sump in FIG. 4 to more clearly illustrate the fluid system by diagrammatic means, the pumping assembly 21 is actually positioned adjacent the bottom wall 13 at substantially the same elevation as sump 19. The inlet 30 of the first pump 33, operable for recirculating fluid to the washing chamber 14, is connected to the sump 19 at a position within the filter screen 23 so as to receive filtered fluid from the sump area 19 for recirculation to the spray arm 16 and spray nozzle 18. This fluid path includes a filtered-fluid conduit 25 connecting the sump area 19 to the inlet 30 of the recirculation pump 33, and a recirculation conduit 26 connecting the outlet 36 of the recirculation pump 33 to the lower spray conduit 38, the upper spray conduit 39, and the auxiliary spray conduit 40.

The second pump 34, operable for draining fluid from the washing chamber 14, is connected to the sump 19 at an upstream position from the filter 23 as to receive unfiltered fluid and particles which have been collected outside the filter screen 23 and in the sump 19 during the recirculation of fluid to the washing chamber 14. The drain pump inlet 31 is connected to the sump 19 by unfiltered-fluid conduit 41. An external drain conduit 43 extends from the outlet 44 of the drain pump 34 to an external drain. A portion of the drain conduit 43 is elevateed above the pump assembly 21 and the lower portion of the washing chamber 14.

Figure 2:
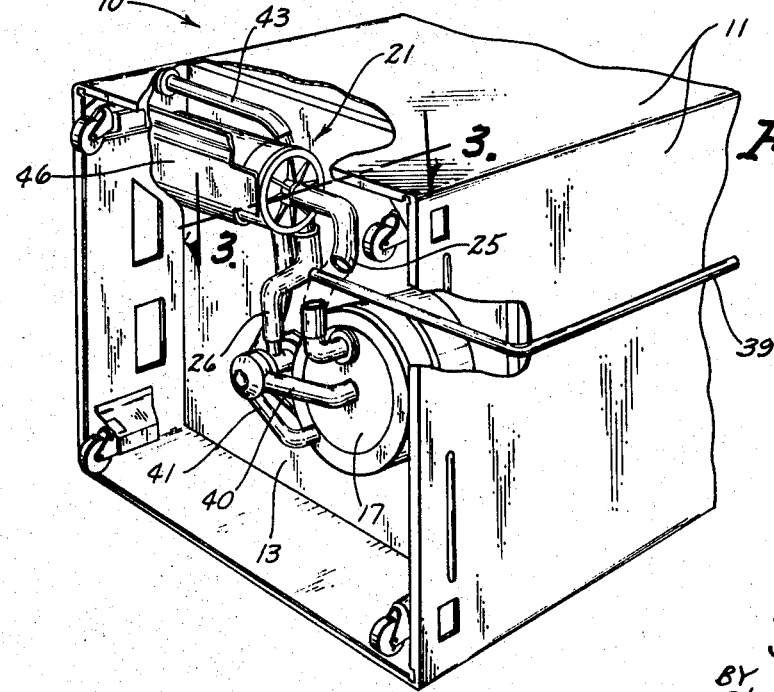
FIG. 2 is a perspective view looking into the bottom of the dishwashing apparatus laying on its side and showing further constructional details of a preferred embodiment of the instant invention.
Figure 5:
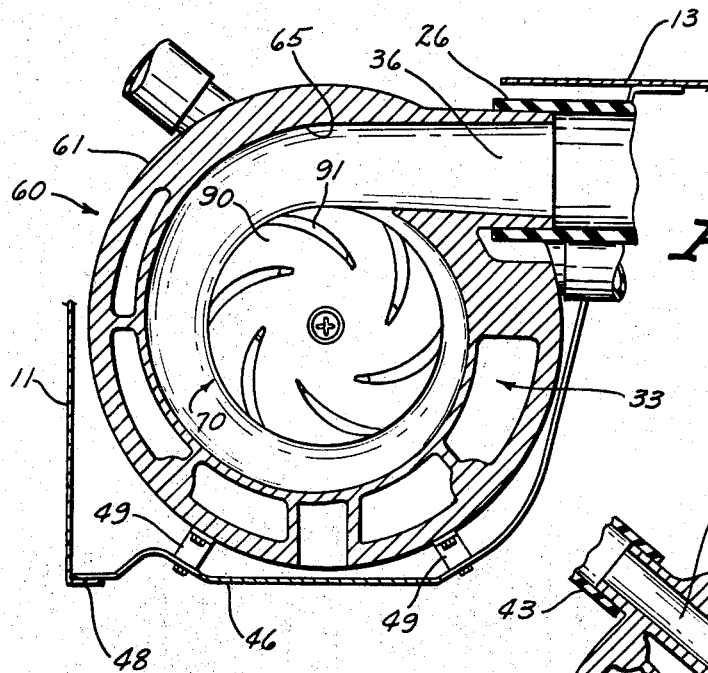
FIG. 5 is a cross sectional view of a first pump portion as taken along lines 5—5 of FIG. 3.
Figure 6:
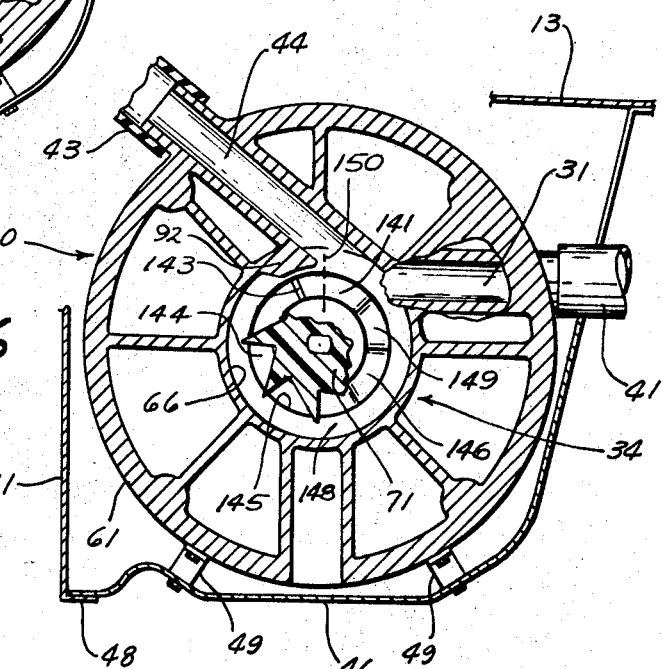
FIG. 6 is a cross sectional view of a second pump portion as taken along lines 6—6 of FIG. 3.

An integral part of the fluid system is the dual pump assembly 21 shown in FIGS. 3, 5, 6, and 7. The pump assembly 21 is driven by a motor 45 and is mounted adjacent the lower side of the bottom wall 13 of the washing chamber 14, along with the motor 45, by a bracket 46 secured along one edge to the bottom flange 48 of the cabinet sidewall 11 and along the other edge to the underside of the washing chamber bottom wall 13. This bracket 46 is shown in perspective in FIG. 2 and in cross section in FIGS. 5 and 6. The motor 45 is attached to the bracket 46 by a pair of resilient longitudinally extending spacers 49 that are connected to the motor 45 and in turn connected to the mounting bracket 46 as shown in FIGS. 5 and 6.

The motor 45 is a fractional horsepower reversible motor of the type commonly used in household appliances and, referring to FIG. 3, includes an end bell 50 and a sidewall portion 51 that are connected to the pump assembly 21 by a plurality of through bolts 53. The motor stator 54 is carried by the sidewall 51 while the armature 55 and shaft 56 are rotatively supported by a first bearing 58 in the end bell 50 and a second bearing 59 retained within a portion of the pump housing 60. The pump housing 60 includes a substantially cylindrical outer portion 61 engageable with the motor sidewall 51 at one end and a pump cover 63 at the other end and further includes an inner portion 64 defining a pair of volute-type pump cavities 65 and 66 and adapted to receive one end of the armature shaft 56.

Figure 7:
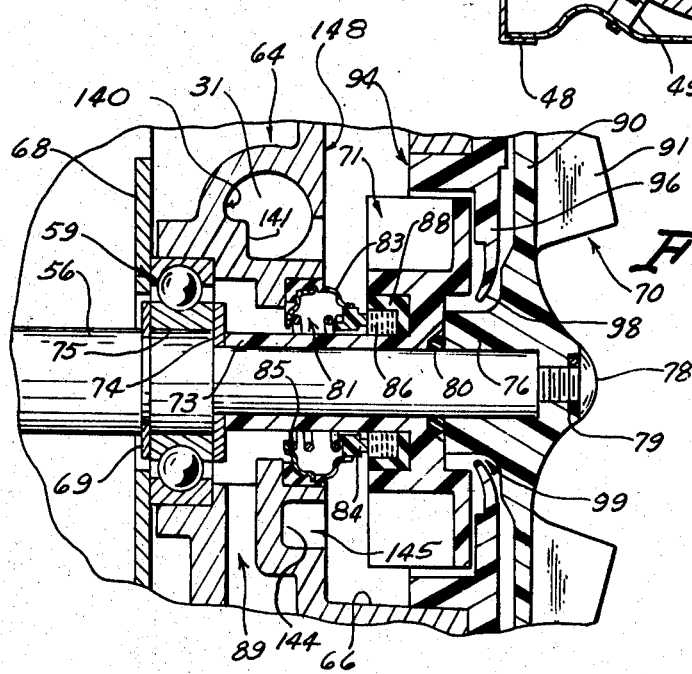
FIG. 7 is an enlarged fragmentary sectional view of the central axis portion showing constructional details of the pump assembly of FIG. 3.

Referring to the central portion 64 of the pump housing 60, as best shown in FIGS. 3 and 7, the one end of the armature shaft 56 is rotatively supported by the second bearing 59 and extends into the cavities 65 and 66 of the pump housing 60. The second bearing 59 is clamped between a portion of the pump housing 60 and a mounting plate 68 that is in turn secured to the pump housing 60. A retaining ring 69 is axially secured to the shaft 56 and bears against the motor side of the bearing 59 to locate the shaft 56 axially with respect to the pump housing 60. The shaft 56 extending into the pump housing 60 is adapted, as by a double-D section, to receive and rotate a pair of impellers 70 and 71. The drain pump impeller 71 includes a longitudinally extending hub 73 engageable with a washer 74 abutting the inner race 75 of the second bearing 59 and thereby properly locates the drain impeller 71 within the second pump cavity 66. The recirculation impeller 70 is also mounted on the shaft 56 and includes a hub portion 76 abutting one end of the drain impeller hub 73 to properly locate the recirculation impeller 70 within the first pump cavity 65. A screw member 78 axially retains the two impellers on the shaft 56.

A sealing system is included in the pump assembly 21 to prevent leakage of fluid from either of the pump cavities 65, 66 into the bearings or the motor area. There is an annular seal 79 beneath the head of the screw 78 that secures the impellers 70, 71 to the shaft 56 for preventing leakage around the screwhead and through the central mounting opening of the first impeller 70. A second annular seal 80 is provided at the juncture of the hubs 76, 73 of the first and second impellers 70, 71 to prevent leakage at this point. These two annular seals 79, 80 are effective for providing a seal between surfaces that rotate as a unit. A seal assembly 81 for preventing leakage at the junction of relatively rotatable members is provided to the left of the second impeller 71. This seal assembly 81 includes a resilient portion 83 sealingly engageable with an annular recess in the housing 60 and further includes a seal ring 84 fixed to this resilient portion 83 and biased by a coil spring 85 toward a wear ring 86 carried by the impeller 71. The wear ring 86 secured to the second impeller 71 is mounted within a recess of the impeller 71 by a resilient cushion member 88.

The housing further defines a fluid vent 89 from the central portion 64 of the pump housing 60 in the area to the left of the seal assembly 81 and extending from the seal area outwardly through the outer portion 61 of the pump housing 60 to allow escape of fluids that might bypass the seal arrangement.

The recirculation pump 33, comprising the first cavity 65 and the recirculation impeller 70 disposed therein, is operable for recirculating fluid to the washing chamber 14 and is shown in section in FIGS. 3 and 5. The pump 33 is defined at least in part by the pump cover 63 that includes an inlet 30 disposed substantially coaxially with the axis of rotation of the pump assembly 21 and connected to the sump 19 through the filtered-fluid conduit 25. The cavity 65 is in the form of a volute terminating in a substantially tangentially extending outlet 36 connected in turn to the recirculation conduit 26. The recirculation impeller 70 includes a flange portion 90 extending outwardly from the hub 76 and a plurality of arcuate-shaped vanes 91 mounted on one side of the flange portion 90. The radially inward portion of the vanes 91 define a central eye 93 coaxially aligned with the recirculation pump inlet 30.

The recirculation pump 33 is operable in a clockwise direction as shown in FIG. 5, and which will be considered the forward direction of the dual pump 21, to effect through centrifugal pumping a pressure differential between the inlet 30 and outlet 36 of the recirculation pump 33 approximately 25 inches of mercury with a fluid flow rate of 45 g.p.m. In the reverse, or counterclockwise, direction of rotation, the recirculation pump 33 is operable for pumping fluid from the inlet 30 to the outlet 36 with a pressure differential of approximately three inches of mercury.

The drain pump 34, comprising the second pump cavity 66 and the drain impeller 71, is shown in section in FIG. 6 and is disposed to the left of the first pump cavity 65 as viewed in FIG. 3. A fragmentary portion of the impeller 71 is shown in FIG. 6 and the impeller blades or vanes removed have the same shape as those shown in FIG. 6. The second volute cavity 66 is relatively smaller in diameter than the first cavity 65 and the difference between the smallest and largest radius of the volute is less than that for the first cavity 65. A dam or fluid cutoff 92 projects into the cavity 66 to a position adjacent the impeller 71 to direct fluid from the cavity 66 into outlet 44.

It is noted that the inlet 31 for the pump cavity 66 is displaced to the left of the impeller 71 as viewed in FIG. 7, or below the impeller 71 as viewed in FIG. 6. It is necessary, therefore, to move the fluid axially within the pump cavity 66. To accomplish this axial movement of the fluid from the inlet 31 to the outlet 44 while also maintaining a pumping system operable for achieving a substantially static condition in the opposite, or clockwise direction of rotation, the leftmost portion of the pump cavity 66, as in FIGS. 3 and 7, includes a particular ramp arrangement as indicated in FIG. 6 and more clearly shown in the ramp development of FIG. 10.

The fluid from the sump 19 enters the second pump cavity 66 generally tangentially through inlet 31 at a radial position substantially aligned with the vanes but axially displaced to the left of the vanes as shown in FIGS. 3 and 7. As best shown in FIGS. 6 and 7, a ramp means extends from the leftmost position 140 of the inlet 31, to the first plane 141 and then up a bevelled step 143 to a plateau 144 extending around a large portion of the annular groove 145 and terminating in a first incline portion 146 disposed for axially moving the fluid to a shelf aligned with the leftmost portion 148 of the outlet 44. A second incline portion 149 extends back to the plane 141.

This ramp means is more specifically shown in the ramp development of FIG. 10 in which the broken line 150 is the broken line 150 shown in FIG. 6. The ramp development, extending toward the left from the broken line 150 shows the ramp construction of the second pump cavity 66 as it extends in a counterclockwise direction in FIG. 6. FIG. 10 shows the plane 141, the bevelled step 143, the plateau 144, and the first and second incline portions 146 and 149. This ramp means is operable for moving fluid from the axial position 140 to the axial position 148 upon rotation of the impeller 71 in the counterclockwise direction.

It may then be seen that, with the pump rotating in a counterclockwise direction, the fluid is pumped from the inlet 31 through the second pump cavity 66 to the tangentially extending outlet 44 disposed angularly from the inlet 31 so that the fluid tends to move circumferentially and axially in a spiral-like path from the inlet 31 toward the outlet 44.

The combination of the second incline portion 149 and the bevelled step portion 143, adjacent the broken line 150 effectively provide a recess or pocket at the point of entry of the inlet into the pump cavity 66 is cooperable with cutoff 92 to provide a unique valve means for facilitating achievement of the efficient pumping operation in the counterclockwise direction while also facilitating achievement of a static condition at the outlet 44 and a condition of relatively small fluid flow toward the inlet 31 with the pump 34 operating in the clockwise direction as in the recirculation operation. This second incline portion 149, and bevelled step portion 143 disposed adjacent the first plane 141 at the inlet in cooperation with cutoff 92, function effectively as a one-way valve within the drain pump 34.

The drain pump impeller 71 is operable in the same direction as the impeller 70 of the recirculation pump 33 and, during operation of the pump assembly 21 in a clockwise direction, the drain pump 34 maintains a substantially static condition in the drain conduit 43 of approximately 6 to 14 inches of water while permitting a relatively small amount of fluid flow from the second cavity 66 toward the unfiltered-fluid conduit 41 through inlet 31. The fluid flowing toward the unfiltered-fluid conduit 41 is that fluid which bypasses a cavity divider member 94 and effectively flows downhill from pump inlet 31 toward the sump 19 as will be more full explained hereinafter.

In the reverse direction of rotation, or in the counterclockwise direction, as during the drain operation, the drain pump 34 is operable for effecting a pressure head in the drain conduit 43 of approximately 3.5 feet of water with a flow of 4.5 g.p.m. through a drain hose of approximately 7/16 inch diameter.

Referring again to FIG. 4, the relative fluid flow effected by the pumping system is shown schematically. In this diagram, the pumping effected by the pumping assembly 21 operating in the clockwise direction is shown in full line arrows. The pumping effected during counterclockwise rotation of the pumping assembly is shown in broken line arrows. More specifically, FIG. 4 indicates that clockwise rotation of pump 33 will effect movement of fluids from sump 19 through filtered-fluid conduit 25 toward inlet 30 and then pass through outlet 36 and be directed toward the lower spray conduit 38, upper spray conduit 39, and auxiliary spray conduit 40. It has been indicated above that clockwise rotation of pump 34 will effect a substantially static pressure in the drain conduit 43 to prevent suction of fluids therefrom and thus no flow arrows are shown for clockwise rotation of pump 34. It has also been indicated above, though not shown schematically in FIG. 4, that a small amount of fluid will bypass the divider member 94 and flow in a generally downhill direction from the inlet 31 of the second pump toward sump 19.

Counterclockwise rotation of the pumping assembly 21 will effect continued flow through pump 33 in the same relative pattern as effected in the clockwise rotation of pump 33. The pumping efficiency, however, will be at a lower lever as indicated hereinabove. The counterclockwise rotation of the pump 34 effects a substantially increased pressure at the outlet 44 to produce a draining of fluid from sump 19 through unfiltered fluid conduit 41, pump 34 and drain conduit 43 to the external drain as shown by broken line arrows in FIG. 2.

Disposed within the pump housing 60 between the first and second cavities 65, 66 is the annular divider member 94 connected to the housing 60 by a plurality of screw members 95. A flange portion 96 extends inwardly between the first and second impellers 70, 71 and terminates in a lip portion 98 adjacent the hub 76 of the first impeller 70. As best shown in FIG. 7, the annular lip portion 98 terminates at a position spaced from the periphery of the impeller hub 76 to define an annular orifice 99 between the first and second pump cavities. This relatively small annular orifice 99 achieves a degree of pressure control and limits fluid flow between the two cavities 65, 66 while avoiding contact between the stationary divider 94 and rotatable impeller hub 76. This lip portion 98 being in close proximity to the hub 76 also prevents passage of particles from the drain pump cavity 66 into the recirculating pump cavity 65 during operation of the pump 21.

It has been found that a small fluid flow through the annular orifice 99 and the drain pump cavity 66 toward the drain pump inlet 31, as described hereinabove, is beneficial in securing a more rapid response of the drain pump 34 in initiating fluid flow from the sump 19 upon reversal in direction of rotation. It is believed that the improved operation results from a condition wherein less air is trapped in the drain pump circuit. The fluid flow through the annular orifice 99 during operation of the pump assembly 21 in the recirculate direction maintains the drain pump circuit substantially full of fluid rather than air and therefore the time required to purge the air from the drain pump 34 upon reversal in direction of rotation is substantially eliminated.

It is noted that the recirculation pump 33 is operable for maintaining a relatively high fluid pressure in a portion of the first pump cavity 65 and in the absence of the divided member 94 the high pressure would be transmitted at least in part to the drain pump cavity 66. Tests on the preferred embodiment have shown that without the divider 94 between the first and second pump cavities 65, 66 defining the orifice 99, the operation of the pump 21 in the clockwise direction will effect recirculation of fluid to the recirculation conduit 26 but will at the same time, due to the transmission of high pressure head to cavity 66, effect drainage of fluid from the sump 19 toward the drain conduit 43. The divider 94, providing an orifice width of approximately 0.010 inch in the preferred embodiment, thus effectively serves as a pressure orifice for controlling pressure differentials and fluid flow between the cavities.

Tests have also shown that the relative size of conduits 41 and 43 are important in maintaining proper operation of pump 34 in the clockwise direction. In an operable embodiment tested, the unfiltered fluid conduit 41 is 3/4 inch I.D. and the drain conduit 43 is 7/16 inch I.D. Decreasing the size of conduit 41 results in increased fluid velocity through the conduit which also tends to result in less accumulation of air in the drain pump circuit.

An electrical schematic diagram and a timer sequencing program for effecting energization of the motor 45 and other components to control the fluid flow system are shown in FIGS. 8 and 9 respectively. Referring to FIG. 8, there is shown, connected between power lines $L_1$ and $L_2$ a plurality of operating and control components under control of a timer 97 including sequentially operable timer contacts 100 through 119 controlled by a plurality of cams (not shown) driven by a timer motor 121 that is in turn controlled by the timer contacts 104, 105, and 106. The circuit further includes a water valve having a coil 123 for selectively permitting flow of water to the washing chamber 14 under the control of a pair of timer contacts 100, 101. A heater 124 disposed within a lower portion of the washing chamber 14 and connected across power lines $L_1$ and $L_2$ is controlled by a manually operable switch 125 and a pair of timer contacts 102, 103. A second switch member 126, linked with the manually operable heater switch 125, is in the timer motor circuit in series with a pair of timer contacts 104, 105. Also connected across power lines $L_1$ and $L_2$ is a detergent dispenser 128 and a rinse conditioner dispenser 129 controlled by contact pairs 114, 115 and 116, 117. The detergent and rinse conditioner dispensers 128 and 129 are selectively operable at predetermined portions of the dishwashing cycle to add chemicals to the washing or rinse fluid to improve the effectiveness.

The main drive motor 45 is connected across power lines $L_1$ and $L_2$ and is under the control of a relay 130 including a switch 131 controlled by a current sensitive coil 133. The drive motor 45 is energized in the forward, or recirculation, direction through a first pair of contacts 107, 108 in series with a first start winding 134 and in the reverse, or drain, direction through a second pair of contacts 108, 109 in series with a second start winding 135. The common contact 108 is connected in series with the relay switch 131. The motor run winding 136 is connected in series with the current relay coil 133 which is in turn connected to power line $L_2$ by a pair of parallel paths. The first path is through a pair of timer contacts 112, 113 whereas the second path to power line $L_2$ is through a separate pair of timer contacts 110, 111 and through subinterval switch contacts 118, 119 associated with the timer mechanism 97 and operable in a manner as will be fully described hereinafter. It is thus seen that the drive motor 45 will be energized and will rotate in a direction as determined by the programmed operation of contact 108 to selectively energize one of the alternate start windings 134 and 135. If, for example, the timer contacts 107, 108 in series with the first start winding 134 are closed, the motor 45 will be rotated in the recirculation direction.

Upon operation of the current sensitive relay switch 131 to the open position, the start winding 134 will be de-energized but the motor 45 will continue rotating in the recirculation direction by virtue of energization of the run winding 136 through the pair to timer contacts 112, 113. It will be seen that the subinterval contacts 118, 119 are operable for effecting a reversal in the direction of rotation at a given point in the cycle.

The subinterval contacts 118, 119 are operative between the open and closed position during each increment or interval of time within the program cycle. As shown in FIG. 9, the subinterval contacts 118, 119 are closed for a major portion of each increment but are open for a short period of time for breaking the circuit to the run winding 136 when energized through timer contacts 110, 111. During this subinterval, the motor 45 stops and the alternate start winding 135 is energized for effecting rotation of the motor 45 in the opposite direction.

It is believed that a consideration of the electrical circuit shown in FIG. 8 and of the timer sequencing program shown in FIG. 9 will allow a complete understanding of the operation of the dishwashing apparatus to one skilled in the art. This consideration of the circuit and sequencing will show that a series of operations is provided by the dishwashing apparatus as follows:

| Increment | Operation | Duration (minutes) |
| --- | --- | --- |
| 1 | "Off" | 1¼ |
| 2 | Pause | 1¼ |
| 3 | Fill | 1¼ |
| 4-5 | Rinse | 2½ |
| 6-7 | Drain | 2½ |
| 8 | "Off" | 1¼ |
| 9 | Pause | 1¼ |
| 10 | Fill | 1¼ |
| 11-12 | Wash | 2½ |
| 13 | Drain | 1¼ |
| 14 | Fill | 1¼ |
| 15-17 | Rinse | 3¾ |
| 18 | Drain | 1¼ |
| 19 | Pause | 1¼ |
| 20 | Fill | 1¼ |
| 21-32 | Wash | 15 |
| 33 | Drain | 1¼ |
| 34 | Fill | 1¼ |
| 35-37 | Rinse | 3¾ |
| 38 | Drain | 1¼ |
| 39 | Fill | 1¼ |
| 40-43 | Rinse | 5 |
| 44-45 | Drain | 1¼ |
| 46-59 | Heat drying | 17½ |
| 60 | Cool down | 1¼ |

This cycle of operations is divided into a first portion including increments 2–7 which may be termed "Rinse and Hold" and a "Dishwashing" portion extending from increment 9 through 45. For heavy washing, the entire portion of increments 9–45 may be utilized whereas a light washing operation may be selected by setting the timer mechanism at increment 19, for example. The final portion of the cycle of operations includes the "Dish Drying" portion and extends from increment 46 through 59.

By way of summary, sequential operation and specific operational characteristics of the fluid system as pertaining to operation of the dishwashing apparatus will be reviewed. The operator may initiate the dishwashing apparatus by manually advancing a timer dial (not shown), for example, to advance the timer mechanism 97 into increment 9 to begin the "Dishwashing" operation. After an initial pause, the fill valve 123 is energized to effect filling of the lower portion of the dishwasher chamber 14 to water level line 32 with approximately three gallons of washing fluid. In the 11th increment, a pair of timer contacts 112, 113 are energized to effect energization of the motor 45. Since the start winding 134 for the washing or recirculation direction of rotation is energized through a pair of timer contacts 107, 108 in series with the start relay switch 131, the motor 45 will be energized in the direction for recirculating fluid to the spray arm 16 and spray nozzle 18. Rotation will be maintained in this direction through the run winding 136 in series with the current relay coil 133 and the timer contacts 112, 113. With the motor 45 energized for the recirculation operation, the pump impellers 70, 71 will rotate in a clockwise direction as shown in FIGS. 5 and 6. Operation of the motor 45 in this clockwise direction rotates both impellers 70, 71 at approximately 3450 r.p.m. for effecting fluid flow from the sump area 19 to the recirculation conduit 26 with the recirculation pump 33 and for effecting a substantially static condition in the drain conduit 43 by the drain pump 34.

As previously indicated, the inlet-to-outlet pressure differential maintained by the recirculation pump 33 is approximately 25 inches of mercury with the fluid flow rate of 45 g.p.m. A major portion of this fluid is directed to the upper and lower spray conduits 38 and 39 whereas a smaller portion is directed to the auxiliary spray conduit 40 for projecting fluid on the downstream side of the filter screen 23 to remove particles therefrom.

Rotation of the drain pump 34 in the clockwise direction maintains a substantially static condition in the drain conduit 43. More specifically, the drain pump 34 maintains a substantially static head of 6 to 14 inches of water in the drain conduit 43 to prevent suction of fluid from the drain conduit 43 toward the washing chamber 14 while at the same time being sufficiently small to prevent pumping of fluid from the sump 19 to a drain through the elevated drain conduit 43. The divider 94 effectively defines a pressure orifice 99 and prevents transfer of the high pressure from the recirculation pump 33 to the drain pump 34 and also thereby limits fluid flow. A limited fluid flow from the recirculation pump 33 into the drain pump 34 is useful in preventing air from being trapped in the drain pump circuit.

Through control of the electrical circuit by the timer contacts 107 through 113 and the subinterval contacts 118, 119 of the timer mechanism 97 the motor direction of rotation may be reversed at a preselected position within the cycle of operations as determined by the timer sequencing program. The reversal in the motor direction will effect rotation of the pump impellers 70, 71 in the counterclockwise direction as viewed in FIGS. 5 and 6.

In the drain direction of rotation, the recirculation pump 33 remains operative for pumping fluid from the sump 19 toward the recirculation conduit 26 as long as sufficient fluid remains in the sump area 19. This pumping is effective for maintaining a pressure head of approximately three inches of mercury pumping toward the recirculation conduit 26.

The drain pump 34 is operable in the counterclockwise direction for effecting pumping of fluid from the sump 19 of the washing chamber 14 toward the drain conduit 43. A preferred embodiment of this pump structure maintains a pressure head of three to four feet of water with a flow of 4.5 g.p.m. through a tube of approximately 7/16 inch diameter.

During this drain direction of rotation in which the washing fluid and particles removed from the articles being washed is pumped to the drain conduit 43, the passage of particles from the drain pump cavity 66 to the recirculation cavity 65 is prevented by the divider member 94 which effectively serves as a proximity seal.

It is therefore seen from the foregoing description that the dishwashing apparatus described hereinabove provides a novel fluid control system including an improved pump structure 21 having a pair of fluid pumps 33, 34 within a common pump housing 60. This pump and fluid system is operative for achieving a desirable recirculation of fluid to the washing chamber and to a self-cleaning filter while maintaining open fluid communication through the pump to the drain conduit but preventing both pump-out and suction during recirculation. This system eliminates electromechanical valves or other auxiliary fluid control devices. The pump structure achieves economies in construction through the use of a common housing and the elimination of the auxiliary fluid control.

In the drawings and specification, there has been set forth a preferred embodiment of the invention and although specific terms are employed, these are used in a generic and descriptive sense only and not for purposes of limitation. Changes in form and the proportion of parts as well as the substitution of equivalents are contemplated as circumstances may suggest or render expedient, without departing from the spirit or scope of this invention as further defined in the following claims.

What is claimed is:

1. A method of controlling fluid to effect the washing of articles in a chamber comprising: introducing washing fluid into said chamber; effecting directionally common rotation of first and second pumps having inlets for receiving washing fluid from said chamber; pumping washing fluid from said chamber with said first pump and spraying at least a portion onto said articles to remove particles therefrom; maintaining a pressure head at the outlet of said second pump below a predetermined positive pressure level to prevent flow of washing fluid from said chamber to an external drain and to prevent suction of fluid from said external drain with said pumps rotating in a first direction; and effecting a substantial increase in pressure head at the outlet of said second pump for draining fluid from said chamber and initially maintaining sufficient fluid flow through said first pump as long as sufficient fluid remains in said chamber to effectively spray fluid into said chamber for washing and rinsing of said articles upon a reversal in rotation of said pumps.

2. A method of controlling fluid to effect the washing of articles in a chamber comprising: introducing washing fluid into said chamber; effecting directionally common rotation of first and second pumps that have inlets for receiving washing fluid from said chamber; pumping washing fluid from said chamber with said first pump and spraying a first portion onto said articles to remove particles therefrom; passing at least said first portion of washing fluid through a filter screen to remove at least a portion of said particles from the washing fluid; spraying a second portion of washing fluid from said first pump onto said filter screen to remove said particles therefrom; maintaining the discharge pressure head of said second pump below a predetermined pressure level to prevent flow of washing fluid from said chamber to an external drain with said pumps rotating in a first direction; and reversing the rotation of said pumps to effect a substantial increase in pressure head at the outlet of said second pump for draining fluid from said chamber while continuing sufficient fluid flow through said first pump to effect a spraying of fluid onto said filter screen for removed of particles therefrom.

3. A method of controlling fluid to effect the washing of articles as defined in claim 2 wherein the last recited step is preceded by the effecting of a relatively small controled fluid flow from said first pump into said second pump with said pumps operating in said first direction to prevent the accumulation of air in the second pump fluid circuit.

4. A method of controlling fluid to effect the washing of articles in a chamber comprising: introducing washing fluid into said chamber; initiating and maintaining rotation of a reversible motor on a first direction for effecting common rotation of first and second pumps with each having an inlet for receiving washing fluid from said chamber; pumping washing fluid from said chamber with said first pump and spraying a first portion onto said articles to remove particles therefrom; passing at least said first portion of washing fluid through a filter screen to remove at least a portion of said particles from the washing fluid; spraying a second portion of washing fluid from said first pump onto said filter screen to remove said particles therefrom; maintaining a substantially static pressure head at the outlet of said second pump below a predetermined positive pressure level to prevent flow of washing fluid from said chamber to an external drain and to prevent suction of fluid from said drain into said chamber through said second pump with said motor rotating in said first direction; and reversing the direction of rotation of said motor and said first and second pumps for initially maintaining fluid flow from the outlet of said first pump for spraying fluid onto said filter screen in sufficient quantity to clean particles therefrom and effecting a substantial increase in pressure head at the outlet of said second pump for draining fluid from said chamber.

5. A method of controlling fluid to effect the washing of articles in a chamber comprising: introducing washing fluid into a sump portion of said chamber; passing at least a portion of the washing fluid through a filter screen in said sump portion to remove particles from the washing fluid; initiating and maintaining rotation of a reversible motor in a first direction for effecting common rotation of a first pump having an inlet for receiving filtered fluid from said sump and a second pump having an inlet for receiving unfiltered washing fluid from said chamber; pumping filtered washing fluid from said chamber with said first pump and spraying a first portion onto said articles to remove additional particles therefrom; spraying a second portion of said filtered washing fluid from said first pump onto said filter screen to remove particles therefrom; maintaining the discharge pressure head of said second pump below a predetermined pressure level to prevent flow of washing fluid from said chamber to an external drain with said motor rotating in said first direction; and reversing the direction of rotation of said motor and said first and second pumps for initially mantaining flow of filtered fluid from the outlet of said first pump in sufficient quantity to clean particles from said filter screen and effecting a substantial increase in the discharge pressure head of said second pump for draining unfiltered fluid and particles contained therein from said chamber.

6. A method of controlling fluid to effect the washing of articles in a chamber comprising: introducing washing fluid into said chamber; initiating and maintaining rotation of a reversible motor in a first direction for effecting common rotation of first and second pumps having inlets for receiving washing fluid from said chamber; pumping washing fluid from said chamber with said first pump and spraying at least a portion onto said articles to remove particles therefrom with said motor operating in said first direction; maintaining a substantially static pressure head at the outlet of said second pump below a predetermined positive pressure level to prevent flow of washing fluid from said chamber to an external drain and to prevent suction of fluid from said drain into said chamber through said second pump with said motor operating in said first direction; introducing a relatively limited fluid flow into said second pump at a location other than said inlet with said motor operating in said first direction to prevent accumulation of air in the second pump fluid circuit; and reversing the direction of rotation of said motor and said first and second pumps for initially maintaining sufficient fluid flow from said first pump to effect a spraying of fluid into said chamber and onto said articles and effecting a substantial increase in pressure head at the outlet of said second pump for effecting substantially immediate pumping of fluid from said chamber toward said external drain.

7. A method of controlling fluid to effect the washing of articles in a chamber comprising: introducing washing fluid into said chamber; initiating and maintaining rotation of a reversible motor in a first direction for effecting common rotation of first and second pumps adjacently positioned within a pump housing and having separate inlets for receiving washing fluid from said chamber; pumping washing fluid from said chamber with said first pump and spraying at least a portion onto said articles to remove particles therefrom with said motor operating in said first direction; maintaining a substantially static pressure head at the outlet of said second pump below a predetermined positive pressure level to prevent flow of washing fluid from said chamber to an external drain while preventing suction of fluid from said drain into said chamber through said second pump with said motor operating in said first direction; maintaining a relatively small controlled fluid flow from said first pump into said second pump with said pumps operating in said first direction to prevent accumulation of air in the second pump fluid circuit; and reversing the direction of rotation of said motor and said first and second pumps for initially maintaining sufficient fluid flow from said first pump to effect a spraying of fluid into said chamber and onto said articles and effecting a substantial increase in pressure head at the outlet of said second pump for effecting substantially immediate pumping of fluid from said chamber toward said external drain.

References Cited

UNITED STATES PATENTS

| | | | |
|---|---|---|---|
| 2,715,410 | 8/1955 | Ruspino | 134—186X |
| 3,090,391 | 5/1963 | Kaldenberg et al. | 134—111X |
| 3,099,992 | 8/1963 | LaFlame | 134—186X |
| 3,244,105 | 4/1966 | LaFlame | 134—186X |
| 3,301,188 | 1/1967 | Belonger | 134—186X |
| 3,364,860 | 1/1968 | Schmitt-Matzen | 134—186X |

MORRIS O. WOLK, Primary Examiner

J. T. ZATARGA, Assistant Examiner

U.S. Cl. X.R.

134—34